FACSIMILE TRANSCEIVER

Filed July 17, 1967 3 Sheets-Sheet 1

Inventor:-
Frank L. Sobchak,

FACSIMILE TRANSCEIVER

Filed July 17, 1967 3 Sheets-Sheet 3

United States Patent Office

3,527,883
Patented Sept. 8, 1970

3,527,883
FACSIMILE TRANSCEIVER

Frank L. Sobchak, Chicago, Ill., assignor to Stewart-Warner Corporation, Chicago, Ill., a corporation of Virginia

Filed July 17, 1967, Ser. No. 653,992
Int. Cl. H04n *3/02*
U.S. Cl. 178—6.6 8 Claims

ABSTRACT OF THE DISCLOSURE

A facsimile transceiver having means for feeding a sheet of copy material in the transmission mode through stationary cylindrical guide means while the copy material is scanned by a single optical scanner assembly revolved about the guide means on a drum. A linear printer bar extends lengthwise of the drum and is mounted for cooperation with a helical electrode on the drum while recording paper is moved therebetween in the receiving mode.

BACKGROUND OF THE INVENTION

Field of the invention

The present invention pertains generally to the field of wire transmission of graphic data and more particularly to facsimile scanner and recorder apparatus for use therein.

Description of the prior art

In one type of facsimile transceiver, such as disclosed and claimed in the copending application of Frans Brouwer and Frank L. Sobchak, Ser. No. 613,545, filed Feb. 2, 1967, copy material, which may consist of type-written or printed text, line diagrams or photographs, or any other graphic material, is introduced into a copy feed roller. A series of optical scanner assemblies are moved in a continuous closed path a portion of which extends parallel to the copy feed roller. Elemental areas of the copy material, defined by the diaphragm aperture means of the optical scanner assemblies, are successfully scanned, horizontal scanning being obtained by movement of the optical scanner assemblies horizontally across the copy material, and vertical scanning being accomplished by the forward motion of the copy material on the copy feed roller. Images from the scanned material, in various shades from black to white, are converted by the optical system into electrical signals. These signals are superimposed on a carrier signal, amplified and sent to a receiver.

In the receiving mode of the transceiver, electrical signals from a transmitter are converted to printing current and passed through associated printer contact means and a linear printer bar. The printer contact means are moved lengthwise of the printer bar, while moist electrolytic recording paper is drawn by power driven heat roller means between the printer contact means and the printer bar transversely of the latter. Metal from the printer bar is deposited on the recording paper and reacts with chemicals therein to produce, in various shades from black to white, an image of the transmitted copy. The electrolytic printing process is completed and the recording paper dried by the heat roller means.

In this type of transceiver, the several optical scanner assemblies must be accurately aligned in corresponding horizontal and vertical planes, transmitting and receiving speeds are somewhat limited, and costs of manufacture and maintenance are not as low as might be desired.

SUMMARY OF THE INVENTION

The present invention is concerned with an improved facsimile device comprising guide means for receiving a sheet of copy material and maintaining the same in substantially cylindrical form, an optical scanner assembly, and means for revolving the optical scanner assembly about the guide means in a continuous closed cylindrical path for scanning the copy material. More particularly, the guide means is comprised of an outer stationary cylinder and a concentric inner stationary cylinder which are adapted to guide therebetween a sheet of copy material. This invention also contemplates the provision of means for automatically feeding a sheet of copy material between the inner and outer cylinders lengthwise thereof in the transmission mode. Additionally, the means for revolving the optical scanner assembly is comprised of a helix drum rotatably mounted on the outer stationary cylinder and having a helical electrode. A linear printer bar extends lengthwise of the drum and is mounted for cooperation with the helical electrode while recording paper is moved therebetween in the receiving mode.

By moving copy material through stationary cylindrical guide means in the transmission mode, copy material can be scanned with a single optical scanner assembly. In this connection, the single optical scanner assembly requires no alignment, and permits the use of a focal point smaller than feasible in prior art devices, for precision scanning with improved resolution. Moreover, by reason of the structural and operational relationships of the transmission and receiving components, unlimited transmitting and receiving speeds are possible, and costs of manufacture and maintenance are minimized.

DESCRIPTION OF THE PREFERRED EMBODIMENTS

Figure 1:
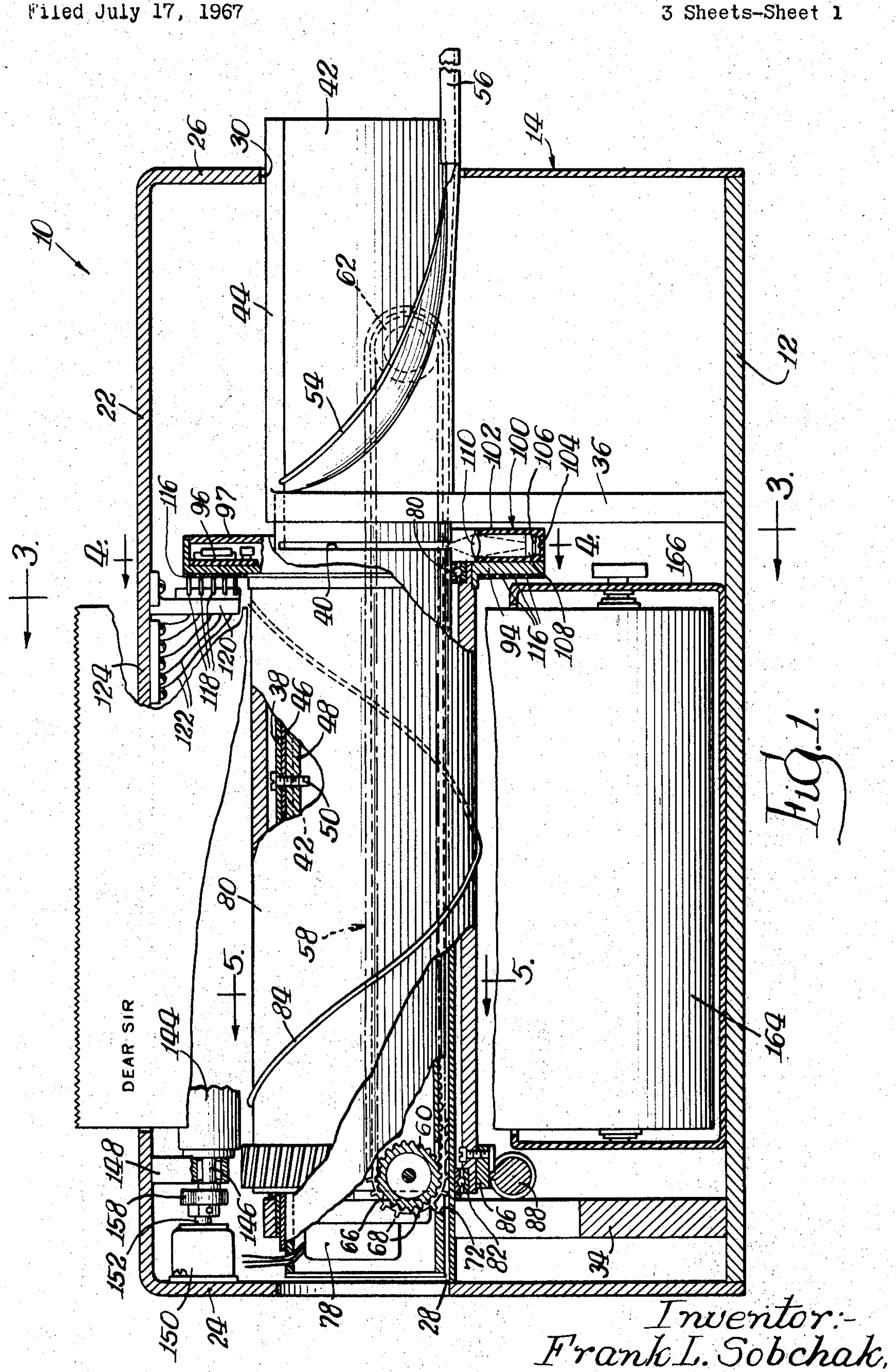
FIG. 1 is a lengthwise vertical view, partly in section and partly in elevation, of the facsimile transceiver of the present invention.
Figures 2, 6:
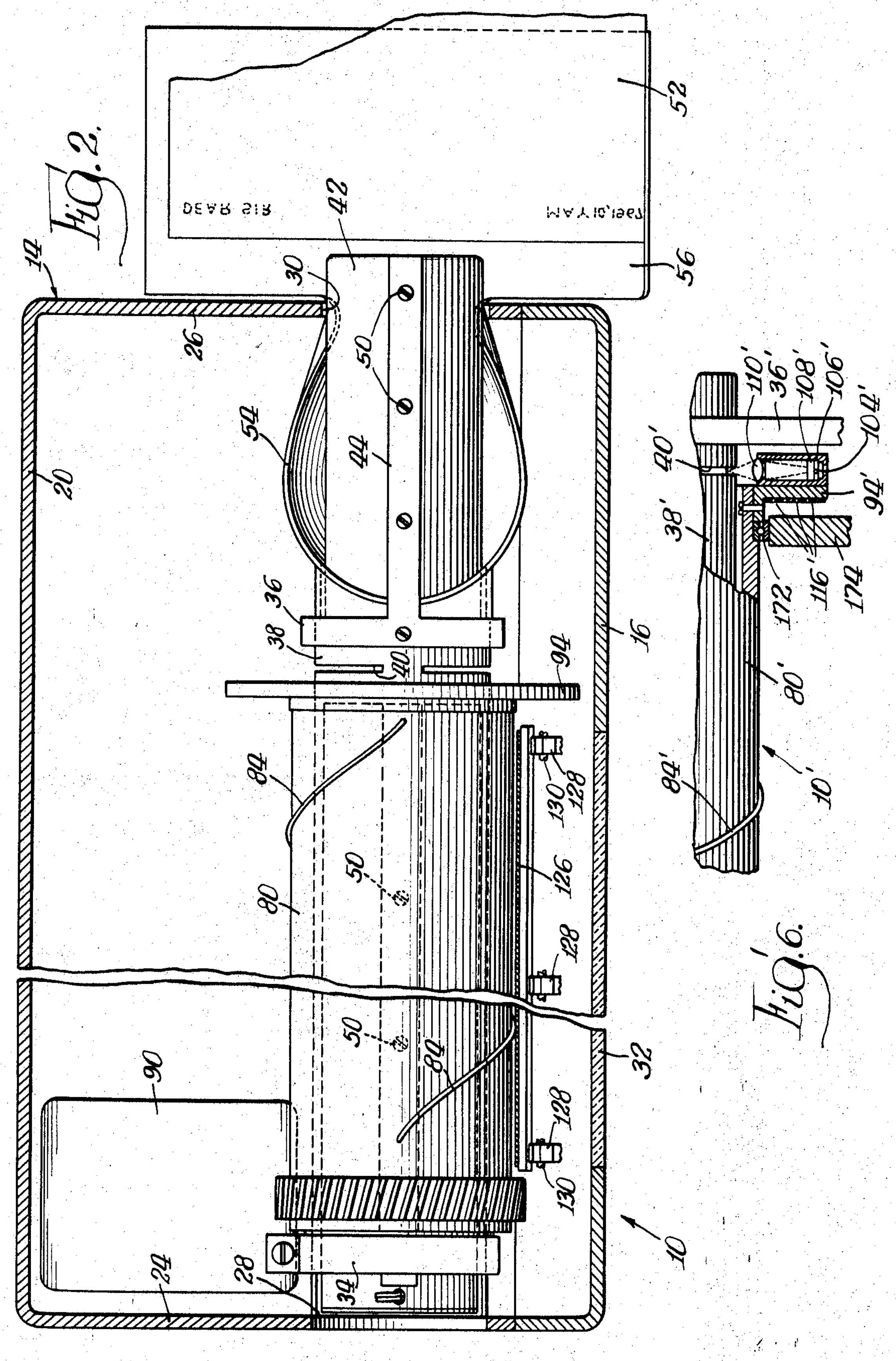
FIG. 2 is a horizontal view, partly in section and partly in elevation, of the facsimile transceiver of FIG. 1.
FIG. 6 is a fragmentary view, partly in section and partly in elevation, of a modified embodiment of mounting means for the rotatable helix drum of the transceiver of FIG. 1.
Figures 3, 4, 5:
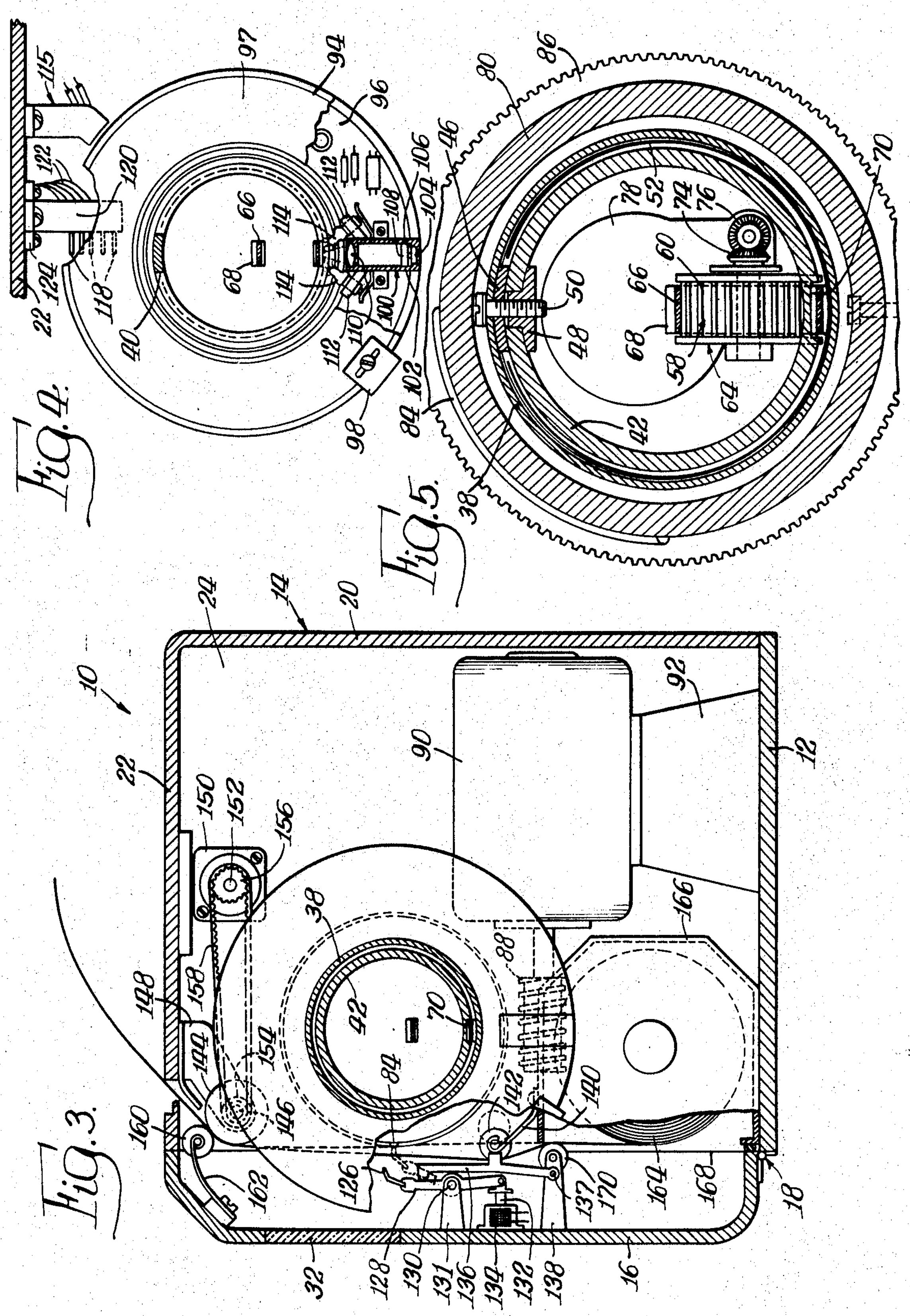
FIG. 3 is a transverse view, taken substantially along the line 3—3 in FIG. 1, looking in the direction indicated by the arrows, with portions being broken away to better illustrate certain of the component parts.
FIG. 4 is a sectional view, taken substantially along the line 4—4 in FIG. 1, looking in the direction indicated by the arrows.
FIG. 5 is an enlarged sectional view, taken substantially along the line 5—5 in FIG. 1, looking in the direction indicated by the arrows.

Referring now to FIGS. 1–3, there is indicated generally by the reference numeral 10 a facsimile transceiver incorporating the principles of the present invention. The facsimile transceiver 10 includes a generally rectangular horizontal base member 12, a cover assembly 14 suitably secured to the base member 12, and a front door assembly 16 pivotally mounted along its lower edge, as at 18, to the forward edge of the base member 12. The cover assembly 14 is comprised of a back wall 20, a top wall 22, and side walls 24 and 26 formed respectively with openings 28 and 30. The front door assembly 16 is provided with a viewing window 32.

Suitably secured to the base member 12 is a pair of vertical spaced apart frame members 34 and 36 in the upper sections of which are mounted the ends of a horizontal stationary cylinder 38. The cylinder 38 is formed with a circumferential scanning slot 40 adjacent the frame member 36. Extending through the cylinder 38 is a concentric horizontal stationary cylinder 42 which at its left end, as viewed in FIGS. 1 and 2, terminates adjacent the sidewall opening 28 and at its right end projects through and slightly beyond the sidewall opening 30. The cylinder 42 is suspended from the cylinder 38 and a lateral arm portion 44 of the frame member 36, as shown in FIGS. 1, 2 and 5, by means of an elongated spacer 46, a clamp strap 48 and screws 50. The iuter and inner stationary cylinders 38 and 42 serve as guide means for receiving a sheet of copy material 52 and maintaining the same in substantially cylindrical form.

A document former 54, which surrounds a portion of the right hand section of the cylinder 42 as shown in FIGS. 1 and 2, is secured at its one end to the frame member 36 and at its other end provides support for a document tray 56 located outwardly of the side wall 26 of the cover assembly 14.

Document feed means, indicated generally by the reference numeral 58, extends lengthwise of the inner cylinder 42 as shown in FIGS. 1 and 5. The feed means 58 comprises a drive pulley 60 and an idler pulley 62 which are mounted for rotation about axes lying transversely of the cylinder 42. Plate means 64 is provided within the cylinder 42 for mounting the drive pulley 60, and similar mounting means (not shown) is provided for the idler pulley 62. Trained over the pulleys 60 and 62 is an endless timing belt 66 having outwardly projecting molded tabs 68. The lower run of the timing belt 66 is adapted to be moved across a portion of the former 54 and through the space between the outer and inner cylinders 38 and 42 for feeding documents therealong. The inner cylinder 42 is formed in its underside with a lengthwise exterior channel 70 to guide the lower run of the belt 66 and with apertures 72 at the ends of the channel 70 to accommodate movement of the belt 66 through the wall of the cylinder 42. The drive pulley 60 has associated therewith a miter gear 74 which has meshing engagement with a miter gear 76 adapted to be driven by a synchronous timing motor 78.

A helix drum 80 (FIGS. 1 and 2) is rotatably mounted, by means of bearing assemblies 82, on the outer stationary cylinder 38. The drum 80 is provided with a conventional helical electrode 84. Secured to the drum 80 at the left end thereof is a gear 86 which has meshing engagement with a worm gear 88 adapted to be driven by a synchronous timing motor 90 (FIG. 3) mounted on motor support means 92.

Secured to the drum 80 at the right end thereof, as viewed in FIG. 1, is an annular adapter 94 on one side of which are mounted, as shown in FIG. 4, a printed circuit amplifier board 96, a cover member 97, a synchronizer pulse shutter 98 and an optical scanner assembly 100. The optical scanner assembly 100 (FIGS. 1, 4 and 6) comprises a radially disposed tubular holder 102 which is adapted to be rotated with the drum 80 in the plane of the scanning slot 40 in the outer stationary cylinder 38. Mounted at the outer end of the holder 102 are a photocell 104, diaphragm means 106 and a filter 108, and mounted at the inner end of the holder 102 is a double convex lens 110. The holder 102 is also provided with side wing portions 112 which support lamp bulbs 114. Secured to the top wall 22 is the lamp and photocell assembly 115 of a synchronizer pulse generator.

Mounted on the other side of the adapter 94 are a plurality of radially spaced annular slip rings 116 which are electrically connected with the helical electrode 84 and the various electrical components on the annular adapter 94. The slip rings 116 are engaged by contact elements or brushes 118 (FIGS. 1 and 4) mounted on a bracket 120 secured to the top wall 22. The brushes 118 are connected through eelctrical conductors 122 with a terminal block 124 suspended from the top wall 22, and the terminal block 124, in turn, is connected to other electrical components of the transceiver 10.

Extending lengthwise of the helix drum 80 at the forward side thereof, as shown in FIGS. 2 and 3, is a linear printer bar 126 supported at the upper end of a plurality of rocker levers 128 secured on a common shaft 130 rotatably mounted in support arms 131 secured to the front door assembly 16. The lower end of one of the levers 128 is pivotally connected to the plunger 132 of a solenoid 134. A rocker lever 136 at its lower end is pivotally connected at 137 to a support arm 138 secured to the front door assembly 16, and at its upper end engages the said one rocker lever 128. A flat leaf spring 140 at its free end carries a roller 142 and engages a boss on the intermediate portion of the rocker lever 136. The spring 140 serve to selectively maintain the printer bar 126 in the inoperative position shown in solid lines in FIG. 3. The printer bar 126 may be moved toward the helix drum 80 into operative print-out relation with the helical electrode 84, as shown in dotted lines in FIG. 3, by energizing the solenoid 134 and drawing the plunger 132 to the left.

Arranged at the upper forward portion of the transceiver 10, as shown in FIGS. 1 and 3, is a heat roller 144 having a pair of stub shafts at the ends thereof. One of the stub shafts 146 is rotatably mounted in a bearing support 148 suspended from the top wall 22 while the other stub shaft (not shown) is rotatably mounted in a bearing support similar to the support 148. The heat roller 144 is adapted to be rotated in the receiving mode by means of a motor 150 having an output shaft 152. The power transmission means between the motor 150 and the heat roller 144 comprises a pulley 154 secured on the stub shaft 146, a pulley 156 secured on the output shaft 152, and a timing belt 158 trained over the pulleys 154 and 156. Cooperating with the heat roller 144 is a tension roller 160 suspended from a leaf spring 162 secured to the front door assembly 16.

As shown in FIG. 3, a roll of moist electrolytic recording paper 164 is rotatably mounted beneath the helix drum 80 within a humidor 166 having a front wall closure 168 supported by and movable with the front door assembly 16. The humidor 166 also serves to support the leaf spring 140 described hereinabove. Paper from the roll 164 is arranged to pass upwardly over a guide roller 170 rotatably mounted at the inner end of the support arm 138, across the roller 142, between the helix drum 80 and the printer bar 126, and between the power driven heat roller 144 and the tension roller 160. The paper is issued at the top of the transceiver 10.

In the transmission mode of the transceiver 10, the solenoid 134 is deenergized. Through the associated rocker levers 128 and 136, and under the biasing force of spring 140, the printer bar 126 is maintained in the inoperative position shown in solid lines in FIG. 3. Also, the roller 142 is maintained in the solid line position shown in FIG. 3 and the recording paper is thereby held away from contact with the helical electrode 84. Further, motors 78 and 90 are energized for respectively effecting movement of the timing belt 66 and rotation of the helix drum 80. As the helix drum 80 rotates, the optical scanner assembly 100 and the lamp bulbs 114 are revolved about the circumferential scanning slot 40 in a continuous closed cylindrical path. Then, a sheet of copy material, with the graphic data to be scanned facing downwardly, is moved automatically or manually from the document tray 56 into the former 54 where it is shaped around the inner cylinder 38. After the copy material has been entered initially into the former 54, the timing belt 66 engages the copy material and automatically feeds the same through the former 54 and the space between the outer and inner stationary cylinders 38 and 42 past the circumferential scanning slot 40. As the copy material moves past the scanning slot 40, it is scanned, line-by-line, an elemental area at a time. In this connection, the lamp bulbs 114 serve as a scanning light source means and provide uniform illumination of object areas of copy material being scanned. The images of these illuminated object areas are transmitted to the optical scanner 100 where they are projected by the lens 110 through the diaphragm means 106 to the photocell 104. The images received by the photocell 104 are converted to electrical signals by suitable circuitry (not shown), and these signals are sent to another transceiver or other suitable facsimile recording device for reproduction of the original copy material. The scanned copy material is discharged at the left end of the cylinder 42 through the side wall opening 28.

In the receiving mode, the solenoid 134 is energized whereupon the rocker levers 128 and 136 are pivoted clockwise as viewed in FIG. 3, the free end of the leaf spring 140 is moved inwardly, the roller 142 is moved to the dotted line position, and the printer bar 126 is moved to the dotted line position against the adjacent section of the helical electrode 84 with the recording paper disposed therebetween. Next, the motor 90 is energized for effecting rotation of the helix drum 80, and the motor 150 is energized for effecting rotation of the heat roller 144 to withdraw recording paper from the roll 164 and move the same between the printer bar 126 and the helical electrode 84. Electrical signals received from another transmitter are converted to printing current by suitable circuitry (not shown) and this current is passed through the helical electrode 84, the recording paper and the printer bar 126. As a consequence, iron from the printer bar 126 is deposited on the recording paper and reacts with chemicals therein to produce an image of the transmitted copy. As the helix drum 80 rotates, successive spiral elemental areas of the helical electrode 84 move across successive linear elemental areas of the printer bar 126. In this manner, copy is reproduced line-by-line, an elemental area at a time, in synchronism with another transceiver or suitable transmitter in which copy material is being scanned. As the recording paper passes over the heat roller 144 it is dried and the electrolytic printing process is completed. Reproduced copy issuing at the top of the transceiver 10 may be viewed immediately through the window 32.

A portion of a modified embodiment of transceiver is shown in FIG. 6. Primed reference numerals have been used to indicate components that are the same or similar to components identified in FIGS. 1–5. In the transceiver 10 the helix drum 80 is rotatably mounted on the outer cylinder 38; in the transceiver 10′ the helix drum 80′ is rotatably mounted independently of the cylinder 38′. More particularly the right hand end of the helix drum 80′ is rotatably mounted by a bearing assembly 172 in a support member 174 suitably secured to the cover assembly and the left hand end of the helix drum 80′ is rotatably mounted in a corresponding manner.

Because the present application is directed to the mechanical features of the transceiver 10 a description of the electrical and electronic circuitry have not been included herein. Circuits that may be used for the transmitting and receiving modes are well known in the facsimile art. And while there has been shown and described a preferred embodiment of the present invention it will be understood by those skilled in the art that various rearrangements and modifications may be made therein without departing from the spirit and scope of the invention.

I claim:

1. In a facsimile device, the combination of guide means including an outer stationary cylinder and a concentric inner stationary cylinder for receiving a sheet of copy material therebetween and maintaining the same in substantially cylindrical form, an optical scanner assembly, a drum rotatably mounted on said outer cylinder, means for rotating said drum, and means mounting said optical scanner assembly on said drum at one end thereof for rotation therewith.

2. The combination of claim 1 wherein said outer cylinder is formed with a circumferential scanning slot, and said optical scanner assembly is revolved in the plane of said scanning slot.

3. The combination of claim 2 including a helical electrode on said drum, and a linear printer bar extending lengthwise of said drum and mounted for cooperation with said helical electrode.

4. The combination of claim 1 including means for feeding a sheet of copy material between said inner and outer cylinders lengthwise thereof.

5. The combination of claim 3 including an endless timing belt extending lengthwise of said inner cylinder with the lower run thereof arranged to move within the space between said inner and outer cylinders for feeding a sheet of copy material lengthwise therethrough, and means for effecting movement of said timing belt; and wherein said inner cylinder is formed with a lengthwise exterior channel for guiding said lower run of said timing belt and with apertures at the ends of said channel to accommodate movement of said timing belt through the wall of said inner cylinder.

6. The combination of claim 1 wherein said inner cylinder extends axially beyond said outer cylinder, and including a stationary former surrounding a portion of said inner cylinder for initially shaping a sheet of copy material around said inner cylinder.

7. In a facsimile transceiver having a transmission mode and a receiving mode, the combination of a drum having a helical electrode, means for rotatably mounting said drum, means for rotating said drum, an optical scanner assembly mounted on said drum at one end thereof for rotation therewith and operative in the transmission mode to scan copy material in said drum, a linear printer bar extending lengthwise of said drum, means for moving said printer bar away from operative relation with said helical electrode in the transmission mode, and means for maintaining said printer bar in operative relation with said helical electrode in the receiving mode.

8. The combination of claim 7 including guide means extending coaxially through said drum for receiving a sheet of copy material and maintaining the same in substantially cylindrical form, and means for feeding a sheet of copy material through said guide means.

References Cited

UNITED STATES PATENTS

| | | | |
|---|---|---|---|
| 2,315,362 | 3/1943 | Wisb et al. | 178—6.6 |
| 2,816,160 | 12/1957 | Young | 178—7.1 |
| 3,313,884 | 4/1967 | Hackenberg | 178—6.6 |

ROBERT L. GRIFFIN, Primary Examiner

B. LEIBOWITZ, Assistant Examiner

U.S. Cl. X.R.

178—7.1